April 19, 1938.  F. CARTLIDGE  2,114,438
LOADING MACHINE
Original Filed Dec. 17, 1934   9 Sheets-Sheet 1

Inventor
Frank Cartlidge
Clarence F. Poole
Attorney

April 19, 1938. F. CARTLIDGE 2,114,438
LOADING MACHINE
Original Filed Dec. 17, 1934 9 Sheets-Sheet 7

Inventor
Frank Cartlidge
Clarence F Poole
Attorney

April 19, 1938.    F. CARTLIDGE    2,114,438
LOADING MACHINE
Original Filed Dec. 17, 1934    9 Sheets-Sheet 8
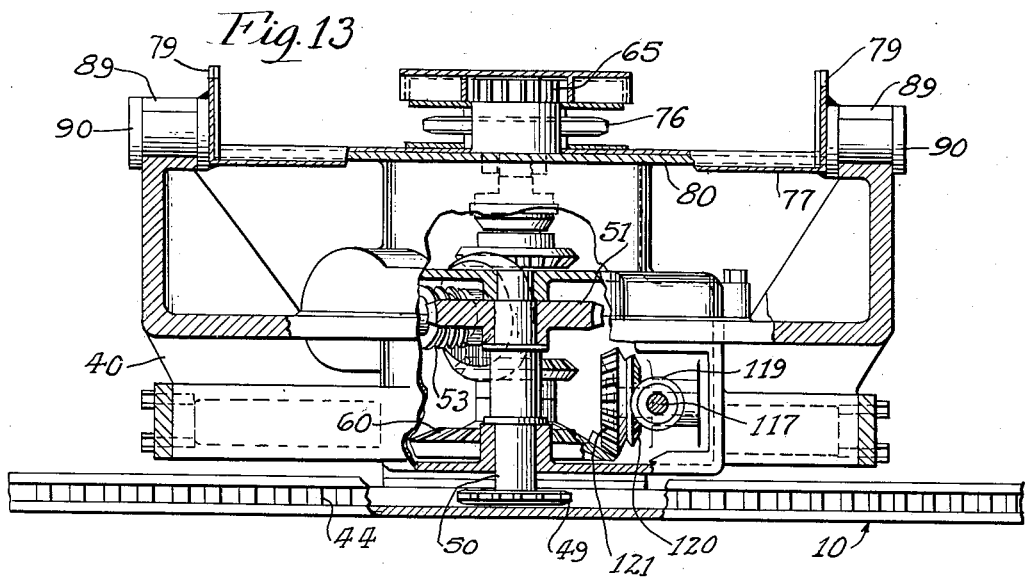
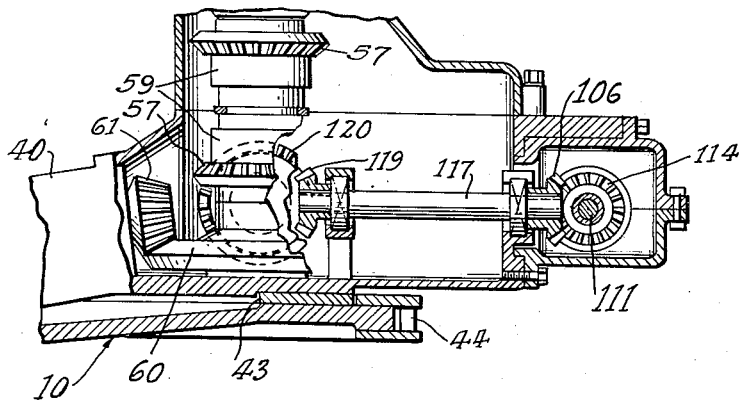
Inventor
Frank Cartlidge
Clarence F. Poole
Attorney

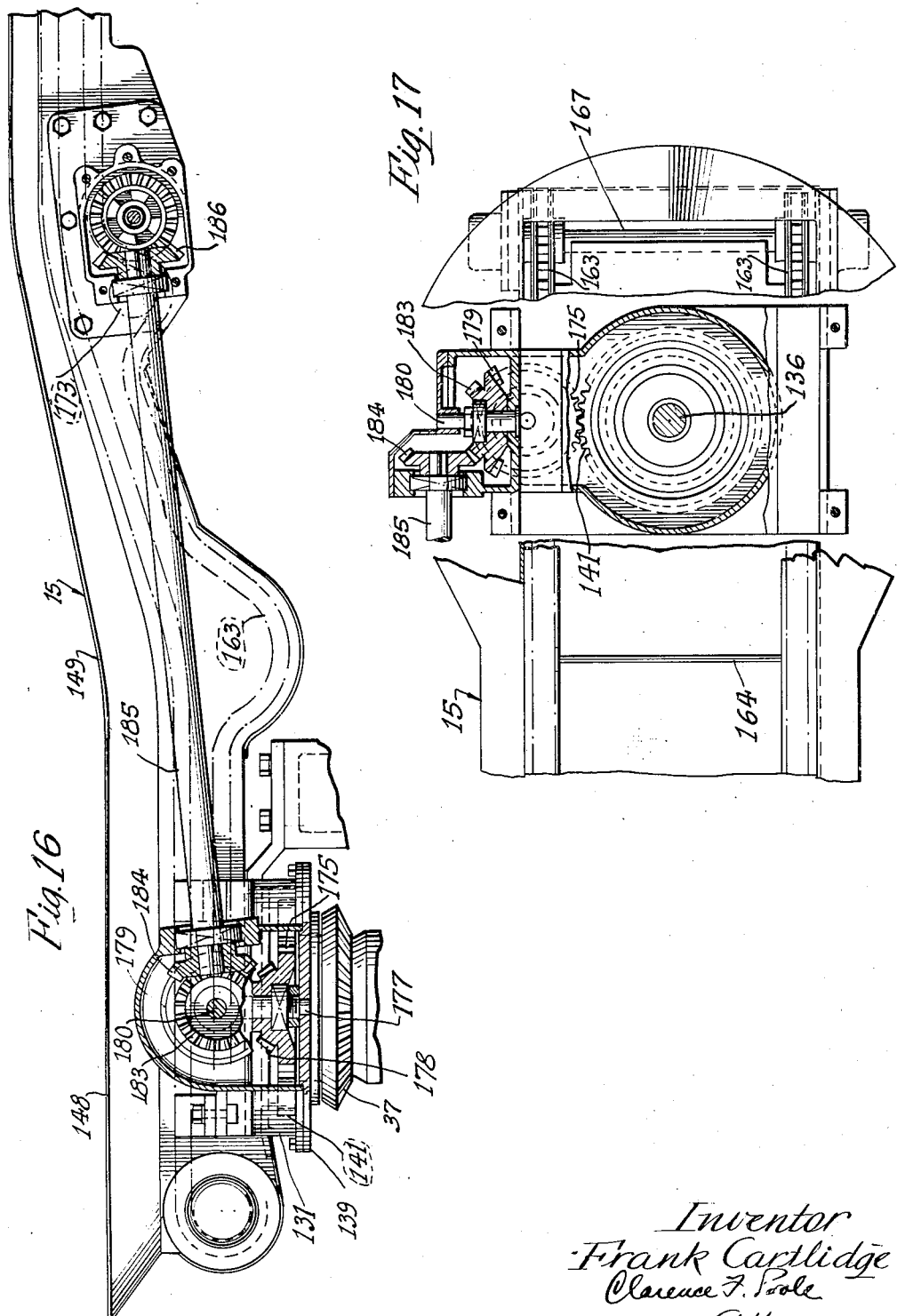

Patented Apr. 19, 1938

2,114,438

UNITED STATES PATENT OFFICE 2,114,438

LOADING MACHINE

Frank Cartlidge, Chicago, Ill., assignor to Goodman Manufacturing Company, Chicago, Ill., a corporation of Illinois Application December 17, 1934, Serial No. 757,853
Renewed June 21, 1937

26 Claims. (Cl. 198—8)

This invention relates to improvements in loading machines of the track-mounted type having a chain type gathering device adapted to gather material by movement of the machine along the track and swinging movement of the gathering device across the front of the track.

My invention has among other objects to provide a new and improved reversible loading machine of the class described adapted to load by movement of the truck along the track and by swinging movement of the gathering and loading element across the forward end thereof, constructed with a view toward compactness, especially in vertical dimensions, and efficient operation in low measures of coal wherein operation of the parts thereof is effected by means contained wholly within the machine itself, and wherein the parts are arranged in a simple, practical and efficient manner to provide a lower, more compact and efficient machine than has heretofore been provided.

My invention may be more clearly understood with reference to the accompanying drawings, wherein:

Figure 10 is a detail side view of the rearward portion of the gathering mechanism with certain parts shown in section to more clearly illustrate the hinged mounting thereof;

Figure 11 is an enlarged fragmentary plan view of the rearward portion of the gathering mechanism with certain parts broken away and shown in section;

Figure 12 is a sectional view taken substantially along line 12—12 of Figure 5;

Figure 13 is a detail transverse section taken adjacent the front of the main frame and looking rearwardly, with parts broken away to illustrate certain details thereof;

Figure 14 is an enlarged detail view in vertical section with parts broken away to illustrate certain details of the drive to the elevating mechanism for the gathering conveyer;

Figure 15 is a fragmentary transverse sectional view taken substantially along line 15—15 of Figure 5;

Figure 16 is an enlarged detail side view showing the drive for the rear conveyer;

Figure 17 is an enlarged fragmentary detail plan view with parts broken away and in section, showing certain other details of the drive for the rear conveyer;

Figure 18 is a fragmentary sectional view taken substantially along line 18—18 of Figure 3; and Figure 19 is a fragmentary sectional view taken substantially along line 19—19 of Figure 6.

Like reference characters refer to like parts throughout the various figures.

Figure 1:
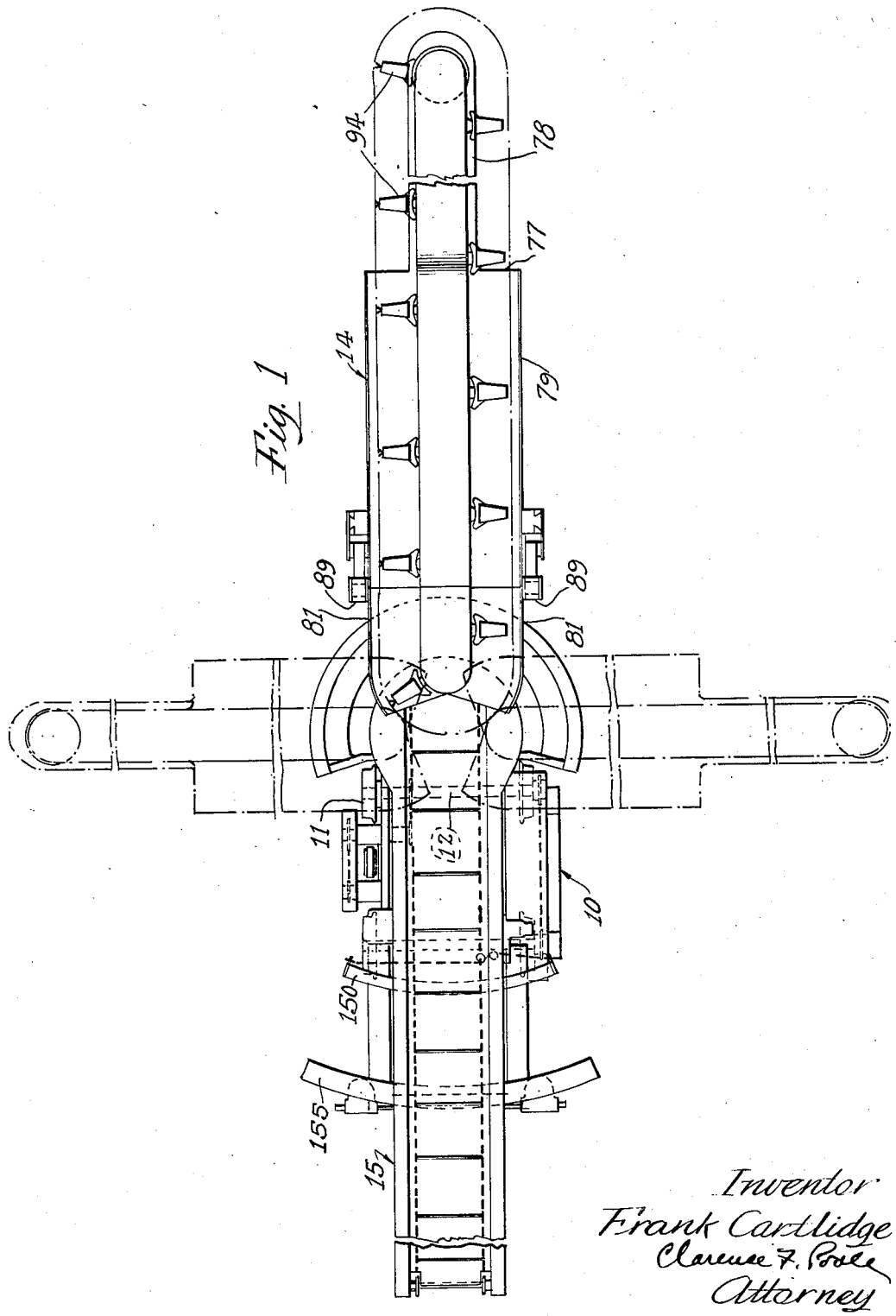
Figure 1 is a top plan view of a preferred form of my invention with parts broken away.

In the drawings, the main elements of the embodiment of my invention illustrated consist of a main frame or truck 10 supported on track wheels 11, 11 and axles 12, 12, an inclined gathering conveyer 14 extending forwardly of the truck, and a discharge conveyer 15 disposed beneath the rear end of said gathering conveyer and extending to the rear of the machine.

Figure 3:
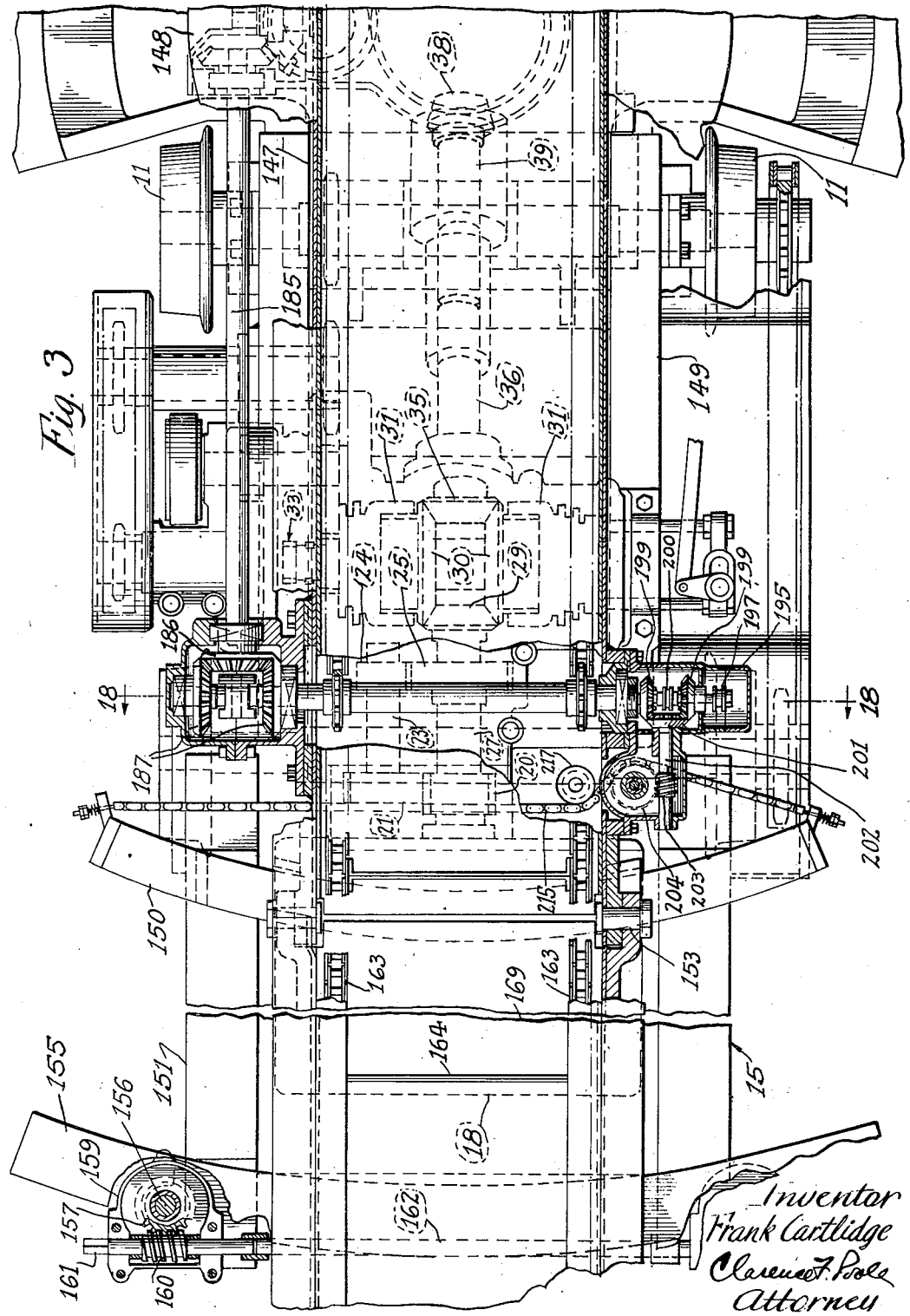
Figure 3 is an enlarged fragmentary top plan view showing a portion near the rear end of the machine shown in Figure 1, with certain parts broken away and in section to illustrate certain details of my invention, not shown in Figure 2.
Figure 4:
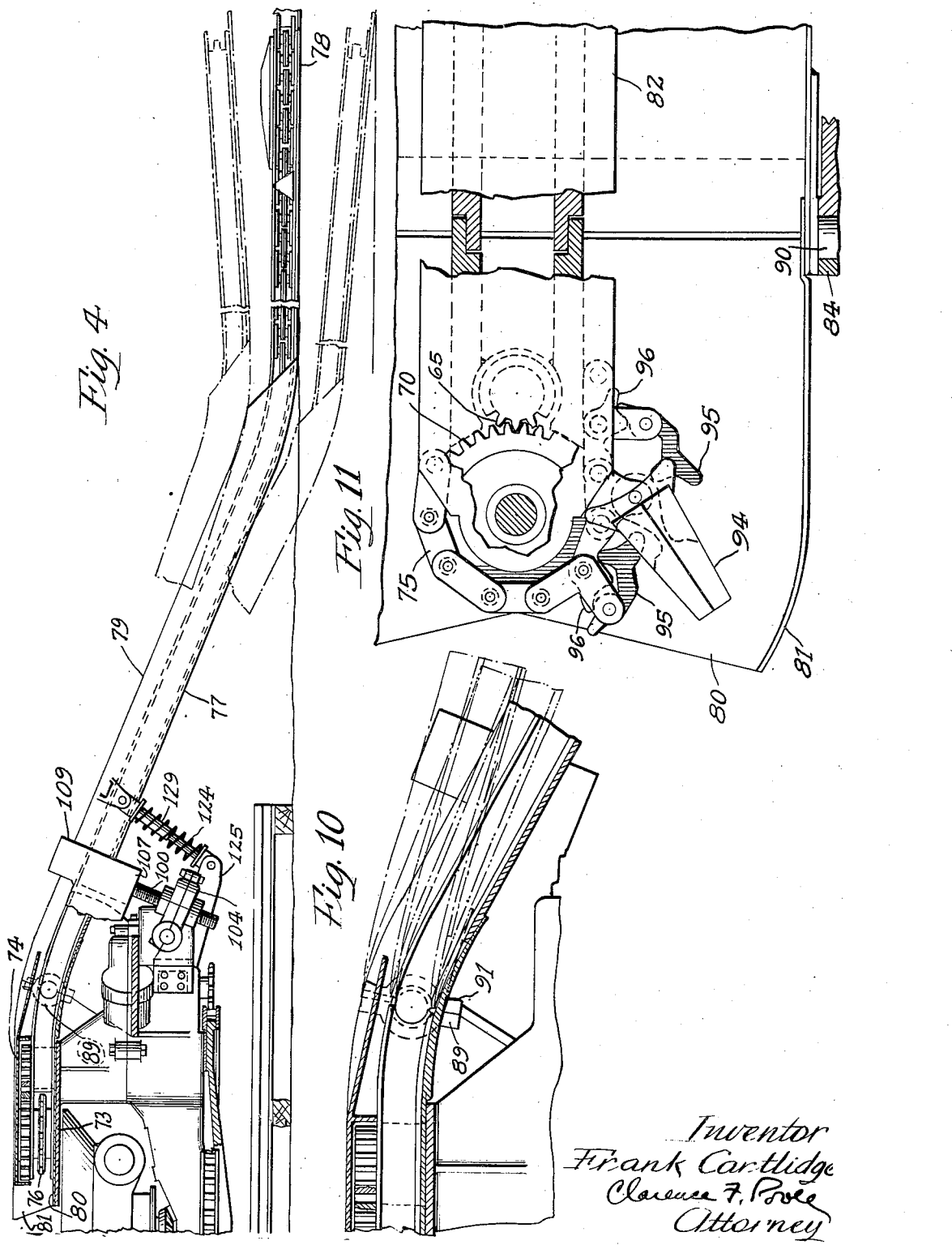
Figure 4 is a fragmentary view in side elevation of the forward portion of the machine, with certain parts broken away and shown in section.

The main operating parts are driven from a motor 18 located between side plates 19, 19 of the truck frame 10. As shown herein, said motor is disposed rearwardly of the rearwardmost truck axle and extends longitudinally of the machine and is provided with a motor pinion 20. Said pinion meshes with and drives a spur gear 21 on a longitudinal shaft 23 (see Figure 3). A pinion 24 is secured to said shaft and meshes with and drives a spur gear 25 on a longitudinal shaft 27. A bevel pinion 29 is secured to the end of said longitudinal shaft and meshes with and drives opposed bevel gears 30, 30. Said bevel gears form a reversible drive connection for the track wheels 11, 11 in a manner similar to that illustrated in my prior application, Serial No. 682,248, filed July 26, 1933, and now Patent No. 2,066,137, so the details thereof will only herein be shown insofar as is necessary to make my present invention clearly understandable. Suitable friction clutches, generally indicated by reference character 31, are provided for selectively connecting either of the bevel gears 30 with the truck driving mechanism through a change speed gear train, generally indicated by reference character 33, for driving the truck in reverse directions without reversal of the motor 18 at either a high or low frictionally controlled speed, in a manner clearly described in my aforementioned prior application.

The drive from the bevel gears 30, 30 to the other operating parts of the machine is generally similar to that illustrated in my aforementioned prior application, and includes a bevel pinion 35 on a longitudinal shaft 36 meshed with and driven by the bevel gears 30, 30. Said bevel pinion forms a driving member for a bevel gear 37 mounted for rotation about a vertical axis coaxial with the axis of pivotal movement of the gathering and discharge conveyers 14 and 15, respectively, by means of a bevel pinion 38 meshing with said bevel gear and keyed on a longitudinally extending shaft 39 coaxial with and driven by the shaft 36.

Referring now particularly to the details of the gathering conveyer 14 and the drive connection from the bevel gear 37 to the operating parts of said conveyer, the latter is supported on a laterally swinging frame 40, which frame, in turn, is journaled on a boss 41, extending upwardly from the main frame 10, for movement about an axis coaxial with the axis of rotation of the bevel gear 37. The forward portion of said swinging frame has bearing engagement with a bearing member 43 on the forward end of the main frame for supporting said swinging frame as the latter is swung lateraly with respect to said main frame.

Figure 2:
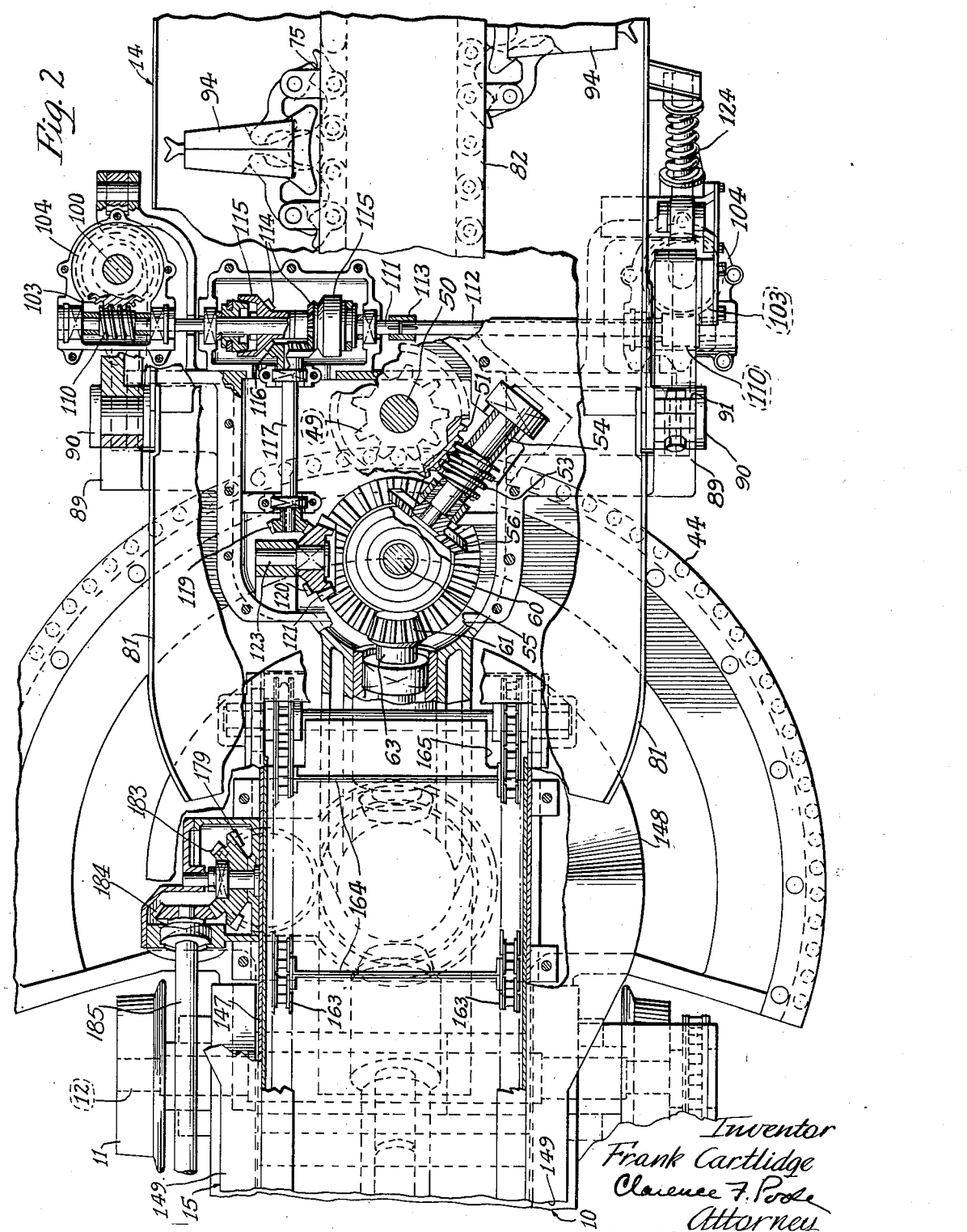
Figure 2 is an enlarged fragmentary top plan view showing a portion near the forward end of the machine shown in Figure 1, with certain parts broken away and shown in section to more clearly illustrate certain details of my invention.

An arcuate rack 44 is provided on the forward end of the main frame (see Figure 2). Said rack is engaged by a toothed member or sprocket 49 secured to the lower end of a vertical shaft 50. Said vertical shaft is journaled in the swinging frame 40 in a suitable manner and has a worm gear 51 keyed to its upper end (see Figures 5 and 13). Said worm gear is meshed with and driven from a worm 53 on a horizontal shaft 54 which extends radially inwardly therefrom towards a vertical shaft 55. A bevel gear 56 is secured to the forward end of said horizontal shaft and meshes with oppositely facing bevel gears 57, 57 mounted on the vertical shaft 55 for free rotation with respect thereto. Said bevel gears are adapted to be selectively connected with said shaft by means of a pair of friction clutches 59, 59. Said friction clutches are herein shown as being of an ordinary disk type for driving either one of said bevel gears from the shaft 55 at a frictionally controlled speed and thus form a reverse drive for the worm 53 and worm gear 51 for swinging said swinging frame and the gathering conveyer 14 across the front of the truck at a relatively low frictionally controlled feeding speed in reverse directions without reversal of the motor 18.

The pitch of the worm 53 and worm gear 51 is herein preferably shown as being such that the gathering element may be held in fixed relationship with respect to said main frame under ordinary conditions, but when certain predetermined limits of pressure are reached, said worm gear may drive said worm and rotate the bevel gears 57, 57 against the friction clutches 59, 59 in order to prevent breakage of the parts of the machine upon overload thereof and to prevent derailing of the machine during the gathering and loading operation.

The shaft 55 is driven from a bevel gear 60 secured thereto adjacent the lower end of said shaft, which is meshed with and driven from a bevel pinion 61 on a shaft 63 extending from said bevel gear in a general longitudinal direction. A bevel pinion 64 is keyed on the rearward end of said shaft and is meshed with and driven from the bevel gear 37.

The drive to the gathering conveyer 14 includes a spur pinion 65 freely mounted on the upper end of the shaft 55. Said spur pinion is journaled on its hub in the upper portion of the swinging frame 40 and clutch jaws 66, 66 depend from the hub of said spur pinion. Said clutch jaws are adapted to be meshed with clutch jaws 67, 67 extending upwardly from a clutch collar 69 feathered on said vertical shaft for selectively driving said pinion from said shaft. Said clutch collar is moved along said shaft by means of a suitable system of links and levers in an ordinary manner, not herein shown since it is no portion of my present invention. Said spur pinion meshes with and drives a spur gear 70 freely mounted on a stud shaft 71. Said stud shaft is secured to and extends upwardly from a rearwardly projecting portion 73 of the swinging frame 40 and its upper end is mounted in a guide portion 74 for an orbitally guided endless chain 75. A sprocket 76 is keyed to the hub of the spur gear 70 beneath said spur gear, and meshes with and drives said endless chain.

Referring now to details of the gathering element 14, illustrated in Figures 1, 4, 5 and 7 to 11, inclusive, said gathering element includes an inclined frame 77 having a relatively flat open forward end 78 adapted to conform to the mine bottom. Said frame is pivoted to the upper forward portion of the swinging frame 40 in a manner which will hereinafter be more fully described and includes a bottom in the form of a pan having laterally spaced upstanding side walls 79, 79 extending along the inclined portion for retaining material thereon. Said frame is a continuation of the rearwardly projecting portion 73 of the swinging frame 40, and said rearwardly projecting portion is provided with a bottom plate 80 and side walls 81, 81 in alignment with and overlapping the side walls 79, 79 at the point of pivotal connection of the frame 77 to the swinging frame 40. The side walls 81, 81 curve inwardly adjacent the rearward end thereof and terminate rearwardly of the forward end of the discharge conveyer 15 for guiding material thereon when said swinging frame is in various positions with respect to said discharge conveyer.

Figure 7:
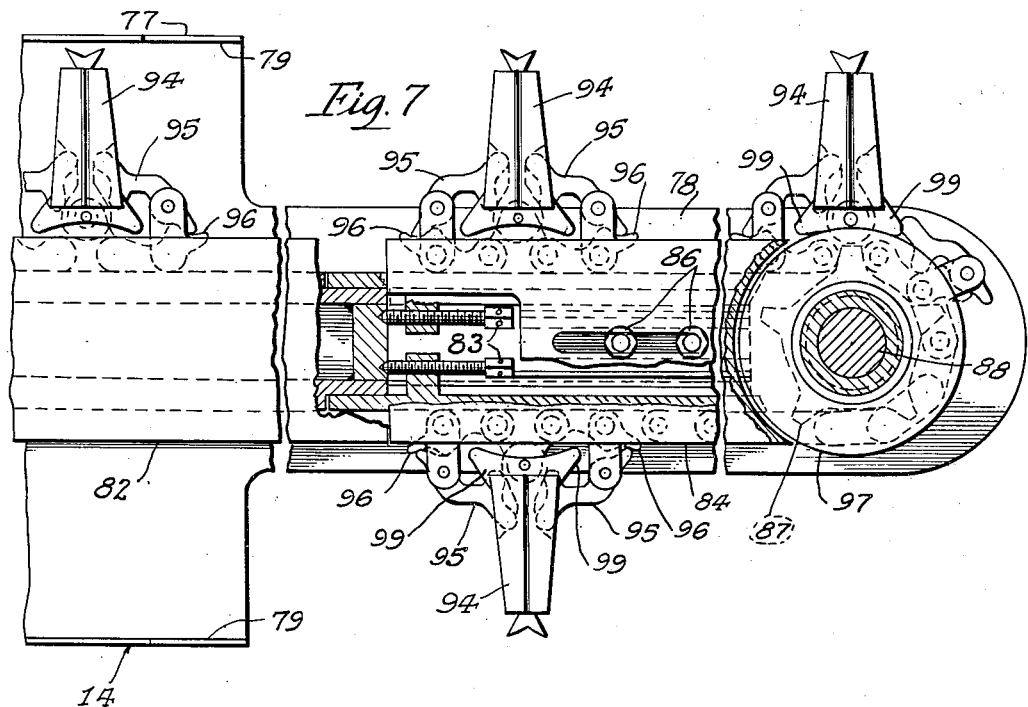
Figure 7 is an enlarged plan view of the forward end of the gathering conveyer showing certain details of construction thereof.
Figure 8:
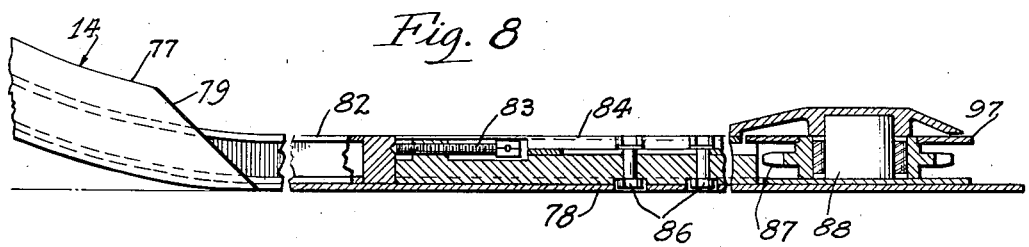
Figure 8 is a fragmentary side view of the forward end of the gathering conveyer, with a portion thereof shown in substantially longitudinal section.
Figure 9:
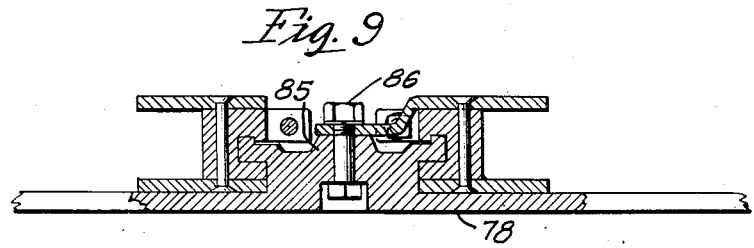
Figure 9 is a fragmentary end view of the gathering conveyer looking toward the rearward end of the machine and showing the chain guide in transverse section.

A chain guide 82 extends longitudinally along the frame 77 and the open lower end 78 thereof to guide the endless chain 75 in a closed orbital path along the gathering conveyer and around the drive sprocket 76 thereof. Said chain guide is of the usual construction, so will not herein be described in detail, except to point out the adjustable features thereof for taking up slack in said chain, which are best illustrated in Figures 7, 8 and 9. Adjustment of said chain guide is effected by means of a pair of set screws 83, 83 threaded in a forward portion 84 of said chain guide and abutting a portion of the rearward portion thereof. The forward portion of said chain guide is guided in a gibbed guide member 85 formed integral with and extending upwardly from the bottom of the forward portion 78 of the frame 77 for slidable movement with respect to said frame by means of nuts and bolts 86, 86.

A suitable direction changing device is provided on the forward end of said guide chain which as herein shown consists of a sprocket 87 journaled on a stud 88 mounted adjacent the forward end of the frame portion 78.

The pivotal support for effecting vertical adjustment of the forward end of the frame 77 is best illustrated in Figures 2, 4, 5, 10, 11 and 13, and includes a pair of brackets 89, 89 formed integrally with opposite sides of the swinging frame 40 adjacent the upper forward end thereof. Said brackets form a bearing support for shouldered stud shafts 90, 90 and said stud shafts are held in engagement with said bearing brackets by means of cap pieces 91, 91 secured thereto by means of suitable nuts and bolts. Said stud shafts are secured to the side walls 79, 79 of the frame 77 in a suitable manner and project laterally therefrom, so as to form a transverse pivotal support for said frame.

The bottom 80 extends forwardly along the underside of the frame 77 a substantial distance and tapers toward a relatively thin portion adjacent its forward end. Said bottom is herein preferably shown as being of a yieldable construction, such as spring steel, in order that it may conform to the inclination of the frame 77. Said bottom thus forms a continuous yieldable surface for moving material along the frame 77 to the discharge end of the rearwardly projecting portion 73 when the front end of the frame 77 is in various positions of adjustment with respect to the ground.

Referring now to the details of the endless chain 75 and the gathering means associated therewith, said endless chain comprises a plurality of links connected together by ball and socket connections (not shown) in the usual manner, so that it may travel in more than one plane. Certain links of said chain have gathering flights 94 pivotally connected thereto which extend laterally therefrom during the gathering operation, and fold rearwardly along the chain at the discharge end of the conveyer. (See Figures 7 and 11.)

The construction and operation of said gathering flights is similar to that disclosed in a prior application, Serial No. 752,646, filed by me on November 12, 1934, patented Sept 10, 1935, No. 2,014,079 so will not herein be shown or described in detail, excepting to generally point out that said flights are held in a laterally extended position with respect to the chain, while traveling along the chain guide 82 by means of a pair of dogs 95, 95 engaging opposite sides thereof and pivotally connected to the chain 75. Movement of said dogs is controlled by means of cams 96, 96 in such a manner that said dogs are held in engagement with said flight while traveling longitudinally along the guide and are moved away from said flight when rounding the drive sprocket 76 to permit said flights to fold rearwardly along the chain at this point and prevent said flights from sweeping material from the discharge conveyer 15.

A disk 97 is secured to the upper surface of the idler sprocket 87 for rotation therewith and is adapted to be engaged by laterally spaced inwardly extending engaging members 99, 99 extending inwardly from said flights to hold said flights in a laterally extended position with respect to the chain while rounding said idler sprocket at the gathering end of the device.

It should thus be apparent that when the flights 94, 94 are traveling along the chain guide 82 and around the idler sprocket 87 they may pick up and move material onto the frame 77 and progress material upwardly therealong to the discharge point of the gathering conveyer and that said flights fold rearwardly along said chain as material is being discharged therefrom. This arrangement permits the discharge and gathering conveyers to be disposed closely adjacent each other and minimizes the tendency of the gathering flights to sweep material from said discharge conveyer and, accordingly, makes possible the construction of a machine of a low vertical height. It should be noted further that inasmuch as the dogs 95, 95 engage opposite sides of the gathering flights that said chain may gather when moving in one direction, as well as in another.

Figure 5:
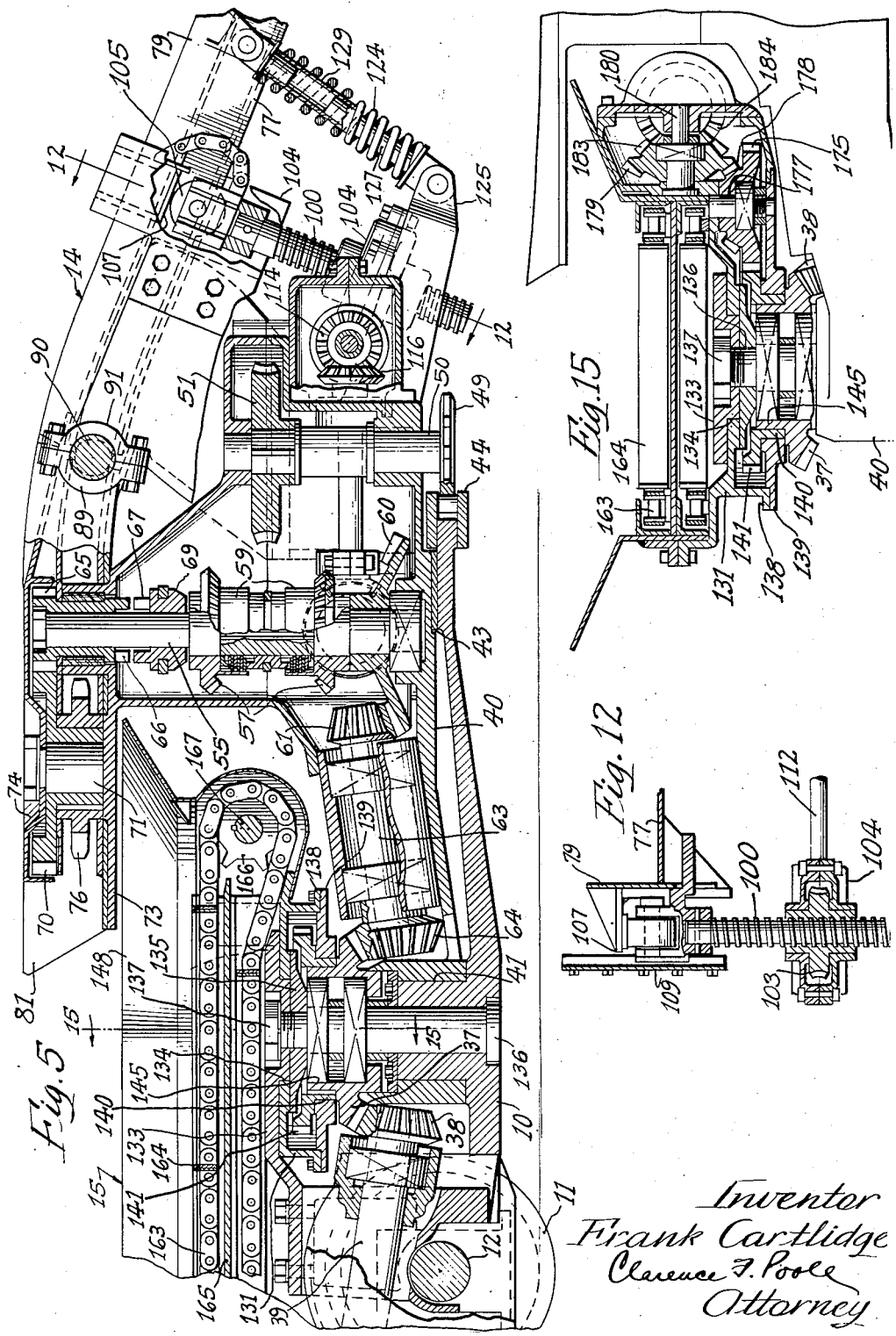
Figure 5 is a fragmentary view in side elevation of the central portion of the machine, drawn to a larger scale than Figure 4 and showing certain parts in substantially longitudinal section.

With reference now in particular to the means for vertically adjusting the forward end of the gathering element 14 about the axis of the stud shafts 90, 90, a pair of threaded shafts 100, 100 are provided, as shown in Figures 2 and 5. Said shafts are threaded within the hubs of worm gears 103, 103 which are journaled in housings 104, 104 pivotally mounted on opposite sides of the swinging frame 40.

A roller 105 is mounted on the upper end of each threaded member 100 and said rollers are adapted to engage the under surface of bearing plates 107, 107 extending laterally from the sides of the frame 77. Said threaded members are guided in suitable guides formed in plates 109, 109, extending forwardly of the swinging frame 40 in a manner similar to that shown in my aforementioned prior application. Thus, rotation of the worm gears 103, 103 in one direction or another causes the shafts 100, 100 to be extended from or retracted within said worm gears for pivoting the gathering element 14 in a vertical plane.

Coaxial worms 110, 110 mesh with and drive the worm gears 103, 103. Said worm and worm gears are of a self-locking type for holding the inclined gathering element 14 in various fixed positions of adjustment with respect to the main frame 10. One of said worms is keyed on the outer end of a transverse shaft 111, while the other worm is keyed on the outer end of a transverse shaft 112. Said shafts are connected together by means of a coupling 113 and are reversely driven from the motor 18 without reversal of the latter by means of a pair of opposed bevel gears 114, 114 freely mounted on the shaft 111 and adapted to be selectively connected thereto by means of friction clutches 115, 115. Said friction clutches may be of any suitable type, but are herein preferably shown as being of the cone type and are shifted and interlocked in a suitable manner, so that one bevel gear only may drive said shaft. A bevel gear 116 on the forward end of a longitudinal shaft 117 meshes with and drives the bevel gears 114, 114. Said longitudinal shaft is journaled in the swinging frame 40 in a suitable manner and has a bevel gear 119 keyed to its rearward end. Said last-named bevel gear meshes with and is driven from a bevel gear 120 cut integral with and facing oppositely from a bevel gear 121, journaled on a stud shaft 123 and meshing with and driven from the bevel gear 60.

Suitable means are provided for supporting a greater portion of the weight of the gathering element 14 on the main frame 10 in such a manner as to prevent over-balancing of the truck when the forward end of said gathering and loading element engages the ground. Said means comprises a pair of compression springs 124, 124 interposed between the conveyer frame 77 and brackets 125, 125 extending forwardly of the swinging frame 40. Each of said compression springs encircles a shaft 127 pivotally mounted on the forward end of one bracket 125, and a tubular member 129 having slidable engagement with said shaft and secured to a member 130 pivoted to the outer side wall 79 of the frame 77.

It will be apparent from the foregoing that the forward end of the gathering and loading conveyer 14 may be adjusted to a position above the ground and mine rails for traveling about the mine or below the mine rails where the bottom is depressed below the rails, for following an uneven or irregular bottom, and that said gathering element is so supported that the greater portion of its weight is taken on the main frame 10 to counterbalance the overhanging weight of the motor 18 and prevent over-balancing of said main frame when the forward end of said gathering element rests on the ground.

The discharge conveyer 15 is preferably mounted on a separate frame 131 which is journaled for movement about an axis coaxial with the pivotal axis of the swinging frame 40. A portion of the upper surface of said frame abuts the under surface of a support member 133 secured to the main frame 10 and extending forwardly of its point of connection thereto. The upper surface of said frame is vertically bored and engages a shoulder 134 depending from said support member. An annular under portion of said frame is supported on a member 135 mounted on a shaft 136 for free rotation with respect thereto. Said shaft forms a bearing support for the bevel gear 37 and frame 131 and is held from movement with respect thereto by a nut 137 threaded on the upper end thereof and abutting the member 133. An annular flange 138 is spaced downwardly from the upper surface of said frame and is secured to an annular member 139 journaled on a depending hub 140 of a spur gear 141. Said spur gear, in turn, is keyed to an upwardly extending hub 145 of the bevel gear 37.

The discharge conveyer 15 comprises a forward frame 147 having angularly outwardly extending side walls 148 of a hopper-like formation which converge into flared side walls 149, 149 extending longitudinally rearwardly therefrom along said frame. The rearward end of said frame is supported on the upper surface of an arcuate support frame 150 for slidable movement therealong. An overhanging frame 151 of said discharge conveyer is transversely pivoted to the rearward end of the frame 147 on laterally extending studs 153, 153 in a suitable manner. Said overhanging portion is provided with a pair of spaced rollers 154, 154 depending therefrom and rotatable about horizontal radial axes intersecting the vertical pivotal axis of said discharge conveyer, which ride on an arcuate support member 155.

The arcuate support member 155 is vertically adjustable for vertically adjusting the rearward end of the overhanging frame 151 and is supported on the upper ends of laterally spaced threaded vertical shafts 156, 156. Said shafts are threaded through threaded hubs of worm gears 157, 157 journaled within suitable worm gear housings 159, 159 secured to the outer sides of the side plates 19, 19. Worms 160, 160 are herein shown as being integrally formed with coaxially arranged transverse shafts 161, 161 and mesh with said worm gears. Said shafts are operatively connected together by means of a shaft 162 and suitable coupling members, and as herein shown, are rotated by means of a suitable hand crank (not shown) adapted to be detachably attached to squared outer ends thereof. Thus, said overhanging frame of said discharge conveyer may be elevated or lowered for adjusting the discharge end of said conveyer to varying heights of mine cars, and vertical movement of said overhanging rearward end is independent of the forward end of said discharge conveyer, which permits a minimum vertical spacing between the conveyers 14 and 15 and maintains the vertical dimensions of the machine to a minimum.

Figure 6:
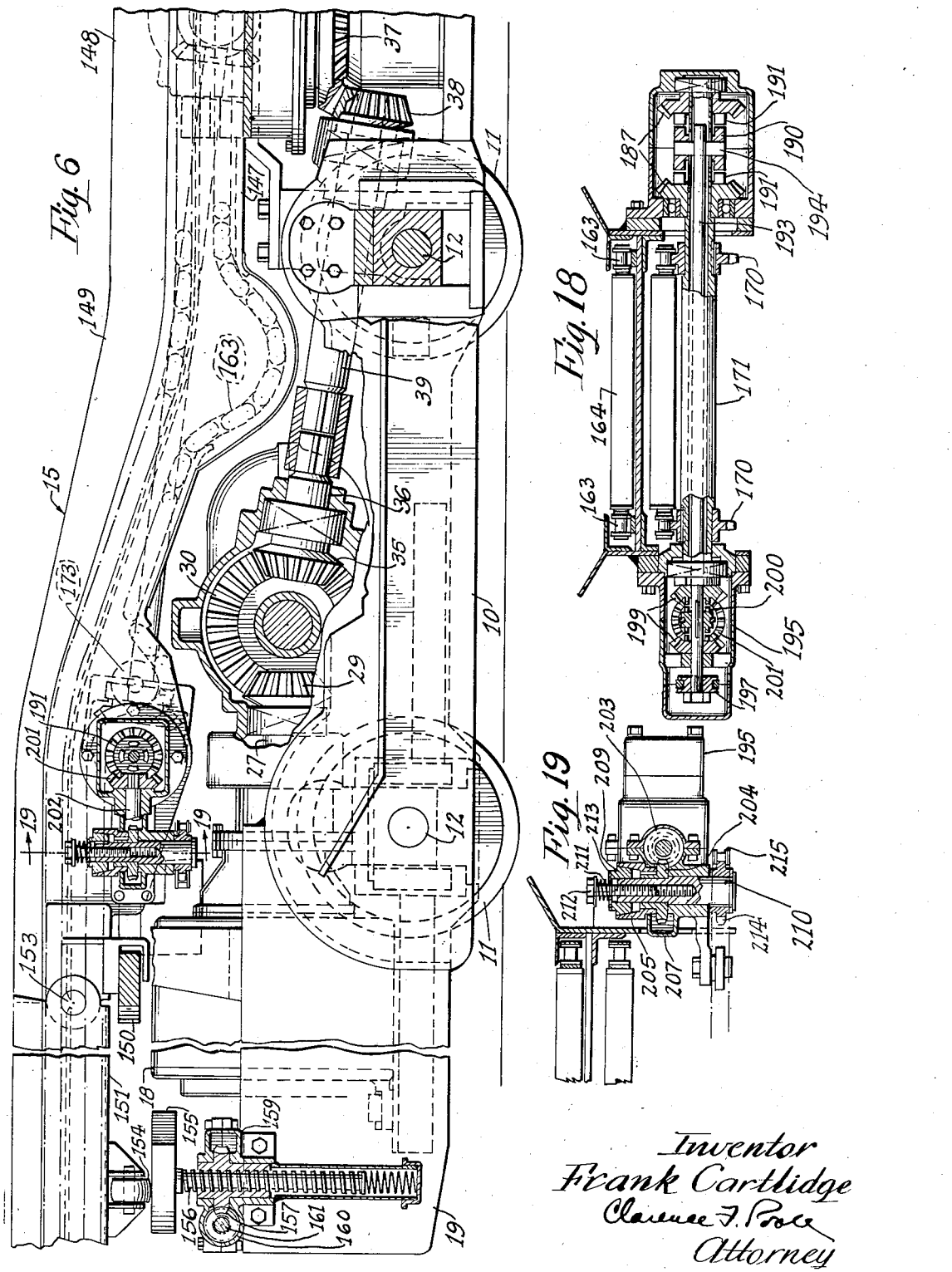
Figure 6 is an enlarged fragmentary view in side elevation of the rearward portion of the machine, with certain parts broken away and shown in section.

The discharge conveyer 15 may be of any type well known to those skilled in the art, but is herein preferably shown as being a flight conveyer. Said conveyer includes a pair of parallel-spaced endless chains 163, 163 having flights 164, 164 disposed therebetween which flights ride along a plate 165 for moving material therealong. Said endless chains are trained around and over idler sprockets 166, 166 disposed adjacent opposite ends of a transverse shaft 167 at the forward end of said discharge conveyer. From thence said chains extend rearwardly along the plate 165 and along a similar plate 169 in the overhanging frame 151 of said discharge conveyer to and around suitable idler sprockets disposed adjacent the rearward end of said overhanging frame. From thence said endless chains extend forwardly beneath the plates 169 and 165 over a pair of parallel-spaced drive sprockets 170, 170 on a sleeve 171 and under a roller 173 and forwardly along the conveyer frame to and around the idler sprockets 166, 166 (see Figures 6 and 18).

With reference now in particular to the novel drive from the motor 18 to said discharge conveyer, best shown in Figures 3, 6, 15, 16, 17 and 18, the bevel gear 37 forms a drive means for selectively swinging, elevating and driving the gathering conveyer 14, and also serves as a means for driving and swinging the discharge conveyer 15 by means of the spur gear 141 keyed to the hub of said bevel gear. Said spur gear meshes with and drives a spur gear 175 journaled on a stud shaft 177 for free rotation with respect thereto. Said last-named spur gear has an upwardly facing bevel pinion 178 cut integral therewith. Said bevel pinion meshes with and drives a bevel gear 179 journaled on a transverse stud shaft 180 supported in the frame 131. An outwardly facing bevel pinion 183 is cut integral with the bevel gear 179 and meshes with and drives a bevel gear 184 on the forward end of a shaft 185. Said last-named shaft is journaled in the conveyer frame 149 and extends longitudinally therealong. A bevel gear 186 is keyed on the rearward end of the shaft 185 and meshes with and drives opposing bevel gears 187, 187 journaled on their hubs in a gear housing 188 secured to the conveyer frame 149 and mounted for free rotation with respect to the hollow shaft or sleeve 171.

Suitable means are provided for selectively connecting either of said bevel gears with said hollow sleeve for driving said sleeve in reverse directions without reversal of the motor 18, which means, as herein shown, comprises a jaw clutch member 190 slidably mounted on said sleeve and adapted to selectively engage clutch jaws 191, 191 extending inwardly from said bevel gears. The means for shifting said clutch member includes a shaft 193 carried within the hollow shaft 171 for rotation therewith and slidable translational movement with respect thereto. Said hollow shaft is provided with a pair of aligned elongated slots adjacent the clutch member 190 through which pass a rectangular driving pin 194. Said driving pin extends through a suitable slot formed in the shaft 193 and has its opposite ends extending through and secured to the jaw clutch member 190 so that said shaft may move said jaw clutch member for driving the hollow shaft 171 and the shaft 193 from either of the bevel gears 187, 187 in reverse directions.

The opposite end of the shaft 193 is journaled in a gear housing 195 for slidable movement with respect thereto and has a clutch collar 197 keyed to its extreme outer end for shifting said shaft and the clutch member 190 by means of a suitable system of levers, in a manner which is not herein shown or described in detail, since it is no portion of my present invention. A pair of facing bevel gears 199, 199 are freely mounted on the shaft 193 within the gear housing 195 between the bearing supports therefor (see Figure 18). Said bevel gears are adapted to be selectively connected with said shaft by means of a suitable jaw clutch member 200 feathered thereon. Said bevel gears mesh with a bevel gear 201 on the forward end of a longitudinally extending shaft 202 (see Figures 3 and 6).

The shaft 202 forms a drive means for driving the mechanism for swinging the discharge conveyer 15 in a horizontal plane and, as herein shown, has a worm 203 cut integral therewith. Said worm meshes with and drives a worm gear 204 keyed on its hub to a friction clutch member 205 which member, in turn, is journaled within a gear housing 207 (see Figure 19). Said friction clutch member may be of any type, but is herein shown as being a friction clutch member of the cone type and is adapted to be engaged by a cone clutch member 209 feathered on a vertical shaft 210. Said shaft is journaled withing the gear housing 207 and passes through the hub of the worm gear 204 and may be freely rotatable with respect thereto. The cone clutch member 209 is engaged with the clutch member 205 by means of a compression spring 211 interposed between a head of a bolt 212 and a collar 213 abutting the upper surface of said cone clutch member. Said bolt is is, in turn, threaded within the shaft 210 and tension of said spring may be adjusted by means of said bolt in an obvious manner. Thus, the shaft 210 may be driven from the worm gear 204 at a frictionally controlled speed.

The shaft 210 has a sprocket 214 keyed on its lower end. Said sprocket meshes with a drive chain 215 yieldably secured at its ends to the ends of the arcuate guide frame 150. Said drive chain is trained around said sprocket and engaged therewith by means of a tension roller 217 so that rotation of said sprocket will laterally swing said discharge conveyer to one side or the other of the truck.

It should be noted that the drive arrangement to the discharge and gathering conveyers is such that all of the driving parts are driven from a single motor, that these parts are reversible so that the gathering conveyer may be swung or elevated without reversing the direction of movement of the gathering chain, and that the discharge conveyer may be independently driven or swung without reversal thereof or without reversal of the gathering conveyer. It should also be noted that the parts are arranged in an efficient and compact manner with a view towards keeping down the height of the machine to a minimum and maintaining the efficiency of operation thereof, and that the complete machine is reversible so that when it is desired to load in a direction opposite to its normal direction of loading, it is merely necessary to reverse the direction of rotation of the motor 18 for driving the gathering chains 75 in an opposite direction than formerly, but by driving the discharge conveyer 15 in the same direction as formerly by means of the reversing bevel gears 187, 187.

In operating the machine, the machine is usually moved to the working face on the mine rails and the gathering conveyer 14 is disposed at right angles with respect thereto. Said gathering conveyer is thence operably driven by the motor 18 in the herein above described manner, and swung about its axis of pivotal connection to the boss 41 until it reaches a position at the extreme left hand side of the face, as is illustrated by dotted lines in Figure 1. In cases where the entry is narrow, said gathering conveyer may be disposed to one side of the track adjacent the mined coal and moved into the coal by movement of the machine along the mine rails by means of the track wheels 11, 11 driven by the motor 18 at a low frictionally controlled feeding speed. When said gathering and loading element has been moved into the coal to the required depth, it is usually swung about its axis of pivotal connection to the boss 41 until the opposite end of the face is reached when it is withdrawn therefrom by rearward movement of the machine along the track.

While I have herein shown and described one form in which my invention may be embodied, it will be understood that the construction and arrangement of the various parts may be changed or altered without departing from the spirit and scope thereof. Furthermore, I do not wish to be construed as limiting myself to the precise construction illustrated, excepting as it may be limited in the appended claims.

I claim as my invention:

1. In an apparatus of the class described, a conveyer including a pair of conveyer frames, one of which is movable with respect to the other, a flight conveyer mounted for movement along said frames, each of said frames having a pan therein along which the flights of said conveyer are adapted to move material, and said pan of one of said frames being yieldable and extending beneath and engaging the under surface of the pan of said other frame to form a continuous pan along said frames when one of said fames is moved with respect to the other.

2. An apparatus in accordance with claim 1, wherein the yieldable pan is of a spring steel construction tapering towards its forward end.

3. In an apparatus of the class described, a conveyer including a frame, and another frame extending forwardly of said frame and mounted for pivotal movement in a vertical plane about a transverse axis disposed adjacent its rearward end, said second-mentioned frame including a pan along which material is adapted to be moved, and said first-mentioned frame including a yieldable pan adapted to slidably engage the underside of said second-mentioned pan to form a continuous pan along said frames when said movable frame is pivotally moved to various positions of adjustment with respect to the ground.

4. An apparatus in accordance with claim 3, wherein the yieldable pan is of a spring steel construction tapering towards its forward end.

5. In an apparatus of the class described, a conveyer including a frame, and another frame forming a continuation of and extending forwardly of said frame and mounted for pivotal movement in a vertical plane about a transverse axis disposed adjacent its rearward end, an endless flight conveyer movable along said frames and including a pan along which the flights of said conveyer are adapted to move material, said pan including a section mounted in said first-mentioned frame and another section mounted in said second-mentioned frame, said first-mentioned section being yieldable and adapted to engage the underside of said second-mentioned section to form a continuous pan along said frames when said movable frame is in various positions of adjustment with respect to the ground.

6. An apparatus in accordance with claim 5, wherein the yieldable section is of a spring steel construction tapering towards its forward end.

7. In a loading apparatus of the class described, a frame, gathering mechanism mounted on and projecting forwardly from said frame comprising an inclined gathering conveyer having a relatively horizontal discharge end and a forward end adapted to engage the ground in substantially parallel relation with respect thereto, said conveyer being adjustable about a transverse axis disposed forwardly of the discharge end thereof and including a frame inclined longitudinally toward the ground having a relatively flat inclined bottom and side walls extending upwardly along the inclined portion thereof, said pivotal connection for said conveyer including brackets projecting forwardly of said frame having said side walls pivotally mounted thereon, and a yieldable bottom plate extending forwardly of the horizontal discharge end of said conveyer and slidably engaging the under surface of said inclined frame.

8. A loading apparatus in accordance with claim 7, wherein said yieldable bottom plate tapers toward its forward end so as to form a continuous uninterrupted bottom from said inclined portion of said conveyer to said horizontal discharge end thereof when said inclined portion is in various positions of adjustment with respect to said discharge portion.

9. A loading machine in accordance with claim 7, wherein said yieldable bottom is of a spring steel construction.

10. A loading machine in accordance with claim 7, wherein said yieldable bottom is of a spring steel construction and tapers toward its forward end so as to form a continuous uninterrupted bottom from said inclined portion of said conveyer to said horizontal discharge end thereof when said inclined portion is in various positions of adjustment with respect to said discharge portion.

11. In a loading apparatus of the class described, a frame, a gathering and loading conveyer supported on said frame including a relatively horizontal discharge portion of a trough-like construction and an inclined frame pivoted for movement with respect to said horizontal discharge portion about a transverse axis, said inclined frame being of a trough-like construction and terminating to a flattened forward end adapted to engage the ground in substantially parallel relation with respect thereto and be slidably moved therealong, an endless gathering chain having gathering arms extending laterally therefrom guided in said discharge portion and inclined frame for movement in planes parallel to the planes of said inclined frame and discharge portion to a point disposed adjacent the rearward end thereof, means for pivoting said inclined frame about said transverse axis for elevating or depressing the forward end thereof, said discharge portion having a yieldable bottom plate engaging the under surface of said inclined frame and forming a continuous bottom for the passage of material to the discharge end of said conveyer when said inclined frame is in various positions of adjustment with respect to said discharge portion.

12. A loading machine in accordance with claim 11, wherein the yieldable bottom plate is of a spring steel construction.

13. A loading machine in accordance with claim 11, wherein the yieldable bottom plate is of a spring steel construction and tapers toward its end.

14. In a loading machine, a truck, a discharge conveyer supported for pivotal movement about a vertical axis disposed forwardly of the forwardmost truck wheels and extending rearwardly beyond the rearward end of said truck, a swinging frame supported for pivotal movement about an axis coaxial with the pivotal axis of said discharge conveyer and extending forwardly therefrom, a gathering and loading conveyer mounted on said frame including a rearward portion secured to said swinging frame and having a discharge end overlapping and disposed closely adjacent the upper boundaries of said discharge conveyer, and an inclined forward portion having a forward end adapted to slidably engage the ground, and means for supporting said inclined forward portion for pivotal movement about a horizontal transverse axis disposed forwardly of the truck comprising a transverse pivotal mounting for said inclined forward portion of said gathering and loading conveyer, the pivotal axis of which mounting is disposed adjacent the forward end of said truck and forwardly of said discharge conveyer, said discharge portion having a yieldable bottom adapted to slidably engage the bottom of said inclined portion for forming a continuous surface for conveying material from the forward to the discharge end of said gathering and loading conveyer.

15. In a loading machine, a truck, a discharge conveyer supported for pivotal movement about a vertical axis disposed forwardly of the forwardmost truck wheels and extending rearwardly beyond the rearward end of said truck, a swinging frame supported for pivotal movement about an axis coaxial with the pivotal axis of said discharge conveyer and extending forwardly therefrom, a gathering and loading conveyer mounted on said frame and having a discharge end overlapping and disposed closely adjacent the upper boundaries of said discharge conveyer and including a horizontal discharge portion of a trough-like construction and an inclined frame communicating therewith and extending forwardly of the forward end thereof, said inclined frame being of a trough-like construction and having an open flattened forward end adapted to engage and slide along the ground, an endless chain having gathering arms extending laterally therefrom guided along said conveyer frames for movement in planes parallel to the planes thereof, and means for supporting said inclined frame for pivotal movement about a transverse axis disposed forwardly of said truck comprising a transverse pivotal connection between said discharge portion and inclined frame disposed adjacent the forward end of said truck, the bottom of said discharge portion of said gathering and loading conveyer being of a yieldable construction and slidably engageable with the under surface of the bottom of said inclined frame, said bottoms forming a continuous conveying surface from the forward to discharge end of said gathering and loading conveyer when said inclined frame is in various positions of adjustment with respect to said discharge portion.

16. A loading machine in accordance with claim 15, wherein the yieldable bottom plate extends forwardly from the discharge portion and engages the undersurface of said inclined frame and tapers toward its forward end.

17. A loading machine in accordance with claim 15, wherein the yieldable bottom plate is of a spring steel construction and extends forwardly from the discharge portion and slidably engages the under surface of said inclined frame and tapers toward its forward end.

18. In a loading machine, a truck, a discharge conveyer mounted on said truck for pivotal movement about a vertical axis, an inclined gathering and loading conveyer pivotally mounted on said truck for movement about a vertical axis and including a frame having a forward end extending beyond the forward end of said truck to the ground and a rear discharge end overlapping and disposed closely adjacent the upper boundaries of said discharge conveyer, and having an endless chain having gathering arms extending laterally therefrom guided for movement therealong, and drive means for said chain comprising a drive sprocket disposed adjacent the rearward end of the discharge end of said gathering and loading conveyer and overlapping said discharge conveyer, a spur gear disposed above said sprocket, another spur gear meshing therewith, and a vertical shaft coaxial with the pivotal axis of said gathering and loading conveyer having selective drive connection with said last-mentioned gear.

19. In a loading machine, a truck, a discharge conveyer mounted on said truck for pivotal movement about a vertical axis, an inclined gathering and loading conveyer pivotally mounted on said truck for movement about a vertical axis and including a frame having a forward end extending beyond the forward end of said truck to the ground and being adjustable about a horizontal transverse axis, and a rear discharge end overlapping and disposed closely adjacent the upper boundaries of said discharge conveyer, and having an endless chain having gathering arms extending laterally therefrom guided for movement along said frame, drive means for said chain comprising a drive sprocket disposed adjacent the rearward end of the discharge portion of said gathering conveyer and overlapping said discharge conveyer, a spur gear disposed above said sprocket, a bevel gear mounted beneath said gathering conveyer and coaxial with the vertical pivotal axis thereof, means driven by said bevel gear for selectively pivoting said gathering conveyer about said transverse axis, other means driven by said bevel gear for swinging said gathering and loading conveyer about its axis of pivotal connection to said truck at a feeding speed, and a selective drive connection from said bevel gear to said spur gear for driving said endless chain independently of adjustable or feeding movement of said conveyer frame.

20. In a loading machine, a truck, a discharge conveyer supported for pivotal movement about a vertical axis disposed forwardly of the forwardmost truck wheels and extending rearwardly beyond the rearward end of said truck, a swinging frame supported for pivotal movement about an axis coaxial with the pivotal axis of said discharge conveyer and extending forwardly therefrom, a gathering and loading conveyer mounted on said swinging frame including a frame having a discharge end overlapping and disposed closely adjacent the upper boundaries of said discharge conveyer, an inclined portion hinged thereto and extending forwardly therefrom toward the ground and a relatively horizontal open flattened forward end adapted to engage and slide along the ground, an endless chain having gathering arms extending laterally therefrom guided for movement along said frame in planes parallel to the planes of said frame, and drive means for said gathering chain comprising a drive sprocket disposed adjacent the rearward end of said discharge end and overlapping said discharge conveyer, a spur gear disposed above said sprocket and a vertical shaft journaled in said swinging frame and having selective driving connection with said spur gear.

21. In a loading machine, a truck, a discharge conveyer supported for pivotal movement about a vertical axis disposed forwardly of the forwardmost truck wheels and extending rearwardly beyond the rearward end of said truck, a swinging frame supported for pivotal movement about an axis coaxial with the pivotal axis of said discharge conveyer and extending forwardly therefrom, a gathering and loading conveyer mounted on said swinging frame including a frame of a trough-like construction having a discharge end overlapping and disposed closely adjacent the upper boundaries of said discharge conveyer, an inclined portion hinged thereto and extending forwardly therefrom towards the ground and a relatively horizontal open flattened forward end adapted to engage and slide along the ground, an endless chain having gathering arms extending laterally therefrom guided for movement along said frame in planes parallel to the planes of said frame, drive means for said gathering chain comprising a drive sprocket disposed adjacent the rearward end of said discharge portion and overlapping said discharge conveyer, a spur gear disposed above said sprocket, a bevel gear journaled in said swinging frame for rotation about a vertical axis, a selective drive connection from said bevel gear to said spur gear, other means driven by said bevel gear for pivoting said gathering conveyer about said transverse axis, and other means driven by said bevel gear for swinging said swinging frame about its axis of pivotal connection to said truck and swinging said gathering conveyer at a feeding speed.

22. In a track-mounted loading machine, a truck supported on track wheels and axles, a motor disposed rearwardly of the rearwardmost truck axles, a discharge conveyer supported for pivotal movement about a vertical axis disposed forwardly of the forwardmost truck axles and extending rearwardly beyond the rearward end of said truck, a swinging frame disposed beneath said discharge conveyer and extending forwardly therefrom, and movable about an axis coaxial with the pivotal axis of said discharge conveyer, a gathering and loading conveyer mounted on said swinging frame and extending forwardly therefrom from a point disposed adjacent the upper end of said discharge conveyer to the ground, said gathering and loading conveyer including a relatively horizontal discharge portion extending over and disposed closely adjacent said discharge conveyer, and an inclined frame pivotally connected to the forward end thereof for pivotal movement about a transverse axis and having a forward end adapted to engage and slide along the ground, an endless chain having gathering arms extending laterally therefrom guided for movement along said frame in planes parallel to the planes of inclination thereof, a gear journaled for rotation about a vertical axis coaxial with the axis of said swinging frame, a drive connection from said gear for independently swinging and driving said discharge conveyer in reverse directions without reversal of said motor, and another drive connection from said gear for driving said gathering chain, adjustably moving said conveyer about said transverse axis and swinging said conveyer across the front of the truck in reverse directions without reversal of said motor.

23. In a track-mounted loading machine, a truck supported on track wheels and axles, a motor disposed rearwardly of the rearwardmost truck axles, a discharge conveyer supported for pivotal movement about a vertical axis disposed forwardly of the forwardmost truck axles and extending rearwardly beyond the rearward end of said truck, a swinging frame disposed beneath said discharge conveyer and extending forwardly therefrom, and movable about an axis coaxial with the pivotal axis of said discharge conveyer, a gathering and loading conveyer mounted on said swinging frame and extending forwardly therefrom from a point disposed adjacent the upper end of said discharge conveyer to the ground, said gathering and loading conveyer including a relatively horizontal discharge portion extending over and disposed closely adjacent said discharge conveyer, an inclined frame pivotally connected to the forward end thereof, for pivotal movement about a transverse axis and having a forward end adapted to engage and slide along the ground, an endless chain having gathering arms extending laterally therefrom guided for movement along said frame in planes parallel to the planes of inclination thereof, a gear journaled for rotation about a vertical axis coaxial with the axis of said swinging frame, a drive connection from said gear for independently swinging and driving said discharge conveyer in reverse directions without reversal of said motor, and another drive connection from said gear for driving said gathering chain, adjustably moving said conveyer about said transverse axis and swinging said conveyer across the front of the truck in reverse directions without reversal of said motor including a gear journaled in said swinging frame for rotation about a vertical axis, a selective drive connection from said gear to said gathering chain including a sprocket overlapping said discharge conveyer, another selective drive connection from said gear for reversely swinging said swinging frame at a feeding speed without reversal of said motor, and a third drive connection from said gear for elevating or lowering the forward end of said gathering conveyer without reversal of said motor.

24. In a track-mounted loading machine, a truck supported on track wheels and axles, a motor disposed rearwardly of the rearwardmost truck axles, a discharge conveyer supported for pivotal movement about a vertical axis disposed forwardly of the forwardmost truck axles and extending rearwardly beyond the rearward end of said truck, a swinging frame disposed beneath said discharge conveyer and extending forwardly therefrom, and movable about an axis coaxial with the pivotal axis of said discharge conveyer, a gathering and loading conveyer mounted on said swinging frame and extending forwardly therefrom from a point disposed adjacent the upper end of said discharge conveyer to the ground, said gathering and loading conveyer including a relatively horizontal discharge portion extending over and disposed closely adjacent said discharge conveyer, an inclined frame pivotally connected to the forward end thereof, for pivotal movement about a transverse axis and having a forward end adapted to engage and slide along the ground, an endless chain having gathering arms extending laterally therefrom guided for movement along said frame in planes parallel to the planes of said frame and discharge portion, a gear journaled for rotation about a vertical axis coaxial with the axis of said swinging frame, a drive connection from said gear for independently swinging and driving said discharge conveyer in reverse directions without reversal of said motor, and another drive connection from said gear for driving said gathering chain, adjustably moving said conveyer about said transverse axis and swinging said conveyer across the front of the truck in reverse directions without reversal of said motor including a gear journaled in said swinging frame for rotation about a vertical axis, a selective drive connection from said gear to said swinging frame for reversely swinging said gathering conveyer without reversal of said motor, another selective drive connection from said gear for elevating or lowering the forward end of said gathering conveyer without reversal of said motor, and a third drive connection from said gear for selectively driving said gathering chain including a shaft coaxial with and driven by said gear, a gear disposed adjacent the upper end of said shaft and selectively connectible therewith, a gear disposed rearwardly thereof and driven thereby, and a sprocket disposed beneath said gear and driven thereby.

25. In a loading apparatus of the class described, a main frame, a motor thereon, an inclined gathering conveyer mounted on said main frame for pivotal movement with respect thereto about a vertical axis disposed rearwardly of the rearward end of said gathering conveyer, a discharge conveyer mounted beneath the discharge end of said gathering conveyer for pivotal movement with respect thereto about an axis coaxial with the axis of pivotal movement of said gathering conveyer, a driving member driven by said motor and arranged coaxial with the pivotal axes of said conveyers comprising a gear, a member driven by said gear, a drive shaft driven by said member, reverse gearing driven by said shaft, a drive connection from said reverse gearing to said discharge conveyer, reverse gearing driven by said reverse gearing, and a self-contained connection from said reverse gearing for swinging said discharge conveyer about said vertical axis, another member driven by said gear, a shaft driven by said gear, a selective connection from said shaft to said discharge conveyer, reverse gearing driven by said shaft, and self-contained means driven by said reverse gearing for swinging said gathering conveyer across the front of said main frame at a feeding speed independently of said discharge conveyer.

26. In a loading apparatus of the class described, a track-mounted truck including a main frame supported on track wheels and parallel spaced axles, a motor disposed rearwardly of the rearwardmost track wheels and axles, gathering and discharge conveyers mounted for pivotal movement about coaxial vertical axes disposed forwardly of the forwardmost truck axles, said gathering conveyer being disposed forwardly of said pivotal axis and including an inclined pan having a forward end adapted to rest on and slide along the ground having a gathering chain movable therealong in planes substantially parallel to the plane of said pan, means driven by said motor for driving and independenty swinging said discharge conveyer independently of said gathering conveyer including a bevel gear coaxial with the vertical swinging axis of said conveyers, a spur gear coaxial with and disposed above said bevel gear, another spur gear meshing with and movable about said last-named spur gear, and a reversible driving connection from said spur gear to said discharge conveyer for driving and swinging said discharge conveyer and another drive connection from said bevel gear for selectively driving said gathering conveyer and independently swinging said gathering conveyer at a feeding speed.

FRANK CARTLIDGE.